(12) United States Patent
Sue

(10) Patent No.: US 9,407,780 B2
(45) Date of Patent: Aug. 2, 2016

(54) LIGHT SCANNING DEVICE AND IMAGE FORMING APPARATUS INCLUDING THE SAME

(71) Applicant: KYOCERA Document Solutions Inc., Osaka (JP)

(72) Inventor: Tomohiro Sue, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/957,018

(22) Filed: Dec. 2, 2015

(65) Prior Publication Data
US 2016/0173718 A1   Jun. 16, 2016

(30) Foreign Application Priority Data

Dec. 11, 2014  (JP) .................................. 2014-250706
Dec. 11, 2014  (JP) .................................. 2014-250708

(51) Int. Cl.
| G03G 15/00 | (2006.01) |
|---|---|
| H04N 1/00 | (2006.01) |
| G06K 7/10 | (2006.01) |
| G03G 21/16 | (2006.01) |
| G02B 7/182 | (2006.01) |

(52) U.S. Cl.
CPC .......... *H04N 1/00551* (2013.01); *G02B 7/1821* (2013.01); *G03G 21/1666* (2013.01); *G06K 7/10623* (2013.01); *G03G 2215/0404* (2013.01); *G03G 2221/1636* (2013.01)

(58) Field of Classification Search
CPC .................. G03G 21/1666; G03G 2215/0404; G03G 2221/1636; H04N 1/113; H04N 1/00551; H04N 1/00559; G06K 7/10623; G06K 15/1204; G06K 15/1228; G02B 7/1821; G02B 26/12

USPC .............. 399/4, 118; 347/138, 245, 263, 261, 347/257, 242
See application file for complete search history.

(56) References Cited

U.S. PATENT DOCUMENTS

| 5,956,072 | A | * | 9/1999 | Omura | ..................... B41J 2/473 |
|---|---|---|---|---|---|
| | | | | | 347/152 |
| 6,621,608 | B2 | * | 9/2003 | Iimura | ................... G02B 26/12 |
| | | | | | 347/256 |
| 7,595,813 | B2 | * | 9/2009 | Hori | ....................... H04N 1/032 |
| | | | | | 347/138 |
| 7,663,656 | B2 | * | 2/2010 | Yamazaki | ................ B41J 2/473 |
| | | | | | 347/242 |

(Continued)

FOREIGN PATENT DOCUMENTS

| JP | 8-22175 A | 1/1996 |
|---|---|---|
| JP | 8-244270 A | 9/1996 |

(Continued)

*Primary Examiner* — Robert Beatty
(74) *Attorney, Agent, or Firm* — Stein IP, LLC

(57) ABSTRACT

According to the present disclosure, a light scanning device includes a housing, a light source, a polygon mirror, a polygon motor, a cooling duct, and a fastening portion. The housing is constituted by a housing main body and an upper lid. The light source is supported at one end side of the housing main body. The cooling duct is provided in the housing main body to extend from a light-source side to a side opposite from the light source. The fastening portion is constituted by first and second fastening portions disposed on the light-source side so as to sandwich the light source therebetween and a third fastening portion disposed at a position that is on the side opposite from the light source and that does not overlap the cooling duct as seen from a screw-fastening direction.

12 Claims, 10 Drawing Sheets

(56) References Cited

U.S. PATENT DOCUMENTS

| | | | |
|---|---|---|---|
| 8,698,867 B2 * | 4/2014 | Tsuchiya | G03G 21/1666 347/242 |
| 8,791,975 B2 * | 7/2014 | Yamazaki | G02B 26/121 347/259 |
| 9,030,519 B2 * | 5/2015 | Narita | B41J 2/471 347/241 |
| 9,229,427 B2 * | 1/2016 | Sue | G03G 21/20 |
| 2011/0129259 A1 * | 6/2011 | Nakano | H04N 1/00519 399/221 |
| 2013/0135421 A1 * | 5/2013 | Takahashi | G03G 15/28 347/224 |

FOREIGN PATENT DOCUMENTS

| | | | |
|---|---|---|---|
| JP | 8-278670 A | | 10/1996 |
| JP | 2000-10036 A | | 1/2000 |
| JP | 2002072116 A | * | 3/2002 |
| JP | 2005024894 A | * | 1/2005 |
| JP | 2008139346 A | * | 6/2008 |

* cited by examiner

LIGHT SCANNING DEVICE AND IMAGE FORMING APPARATUS INCLUDING THE SAME

INCORPORATION BY REFERENCE

This application is based upon and claims the benefit of priority from the corresponding Japanese Patent Applications No. 2014-250706 filed on Dec. 11, 2014 and No. 2014-250708 filed on Dec. 11, 2014, the entire contents of which are incorporated herein by reference.

BACKGROUND

The present disclosure relates to light scanning devices that write and form images by scanning light beams and that are used in image forming apparatuses such as printers, copiers, and facsimile machines.

Conventional image forming apparatuses using the electrophotographic method are equipped with light scanning devices that scans light beams (laser light) modulated according to input image data across the surface of a photosensitive drum charged uniformly by a charger. In such image forming apparatuses, an image forming process is performed in the following steps: an electrostatic latent image is formed by a light scanning device, the electrostatic latent image is developed into a toner image by a developing device, the toner image is transferred onto a recording sheet of paper or the like, and then the transferred toner image is fixed into a permanent image by a fixing device.

Such a light scanning device includes a light source such as a laser diode (LD), and optical components such as a polygon mirror, a scanning lens, and a plane mirror, which are accommodated inside a housing. Among the units constituting an image forming apparatus, a light scanning device is a high precision device, and thus factors such as vibration and thermal deformation due to high-speed rotation of the polygon mirror need to be taken into consideration in designing the configuration of the light scanning device.

For example, there is known a light scanning device fitting structure such that units constituting a light scanning device are first mounted on an inside of a top panel of a housing case having an open bottom face, then the housing case is fixed to tie bars placed on a pair of right and left jig blocks, and then the housing case is fitted and fixed to a main frame of a printer, together with the tie bars.

There is also known a light scanning device including a first frame that holds a plurality of optical components including a light beam generator and a light deflector, a second frame that holds light-beam direction changing means that receives a light beam output from the last-stage optical component of the first frame and emits light in a direction toward an image forming surface, frame uniting means that unites the first and second frames by fixing them to each other with the second frame positioned with respect to the first frame, and frame fixing means that fixes the united first and second frames independently to different predetermined stationary members.

There is also known a light scanning device in which positioning and fixing in a height direction is achieved by three of a plurality of positioning portions provided in an optical box, and apart from the three positioning portions, an elastic member is provided via which to achieve pressing down in the height direction. There is also known a light scanning device that has at least one positioning plate for positioning an optical box with respect to supporting means for supporting the optical box, the positioning plate including first and second positioning portions disposed oriented in different directions from each other, positioning of the optical box being performed by means of the first or second positioning portion.

SUMMARY

According to one aspect of the present disclosure, a light scanning device deflects a light beam and scans the deflected light beam on a target surface, and includes a housing, a light source, a polygon mirror, and a polygon motor. The housing is constituted by a housing main body and a lid attached to an opening of the housing main body. The light source is supported at one end side of the housing main body, and emits a light beam. The polygon mirror deflects a light beam emitted from the light source. The polygon motor is supported at a substantially center part of the housing main body, and drives the polygon mirror to rotate. The housing main body is provided with a cooling duct that extends from a light-source side, through the substantially center part of the housing main body, to an end portion on a side opposite from the light source, and through which flows an air flow that cools down the polygon motor, and a fastening portion where screws are fastened for fixing the housing to a man body frame of an image forming apparatus. The fastening portion is constituted by first and second fastening portions disposed on the light-source side of the housing main body so as to sandwich the light source therebetween, and a third fastening portion that is disposed in a position in the housing main body that is on the side opposite from the light source and that does not overlap the cooling duct as seen from a screw-fastening direction.

Still other objects and specific advantages of the present disclosure will become apparent from the following descriptions of preferred embodiments.

BRIEF DESCRIPTION OF THE DRAWINGS

FIG. 2 is a perspective view illustrating an internal structure of the light scanning device 4a;

FIG. 3 is a plan view illustrating the internal structure of the light scanning device 4a;

FIG. 4 is a side sectional view schematically illustrating the internal structure of the light scanning device 4a;

DETAILED DESCRIPTION

Figure 1:
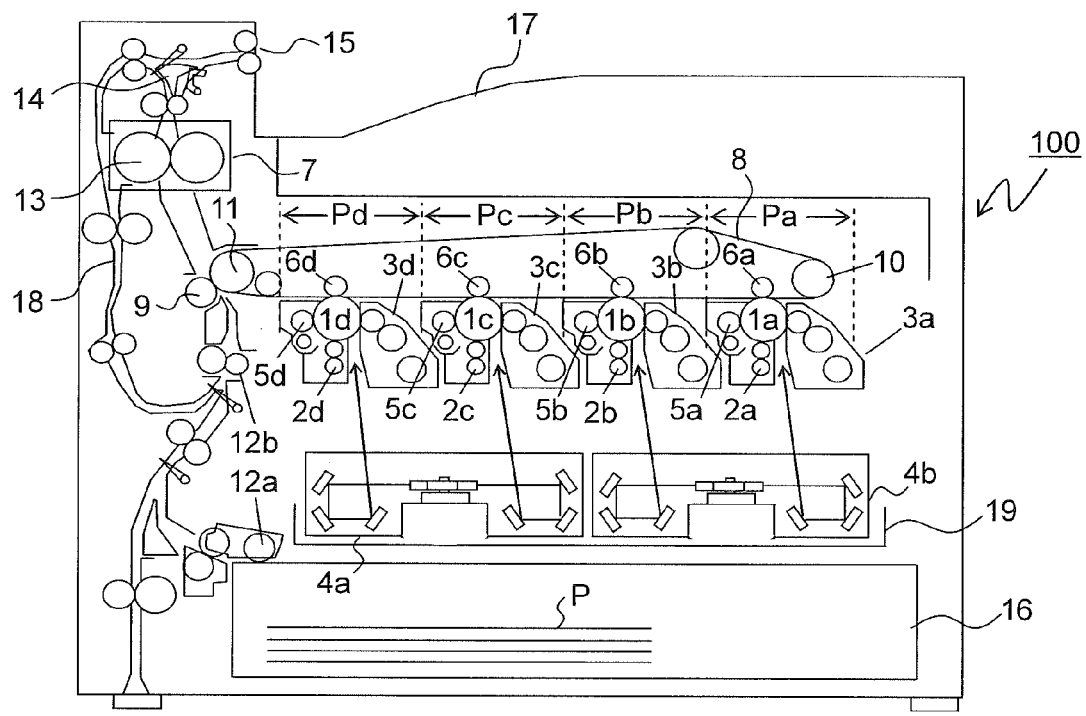
FIG. 1 is a schematic diagram illustrating an overall configuration of an image forming apparatus 100 incorporating light scanning devices 4a and 4b according to one embodiment of the present disclosure.

Hereinafter, embodiments of the present disclosure will be described with reference to the accompanying drawings. FIG. 1 is a schematic sectional view illustrating an image forming apparatus 100 incorporating light scanning devices 4a and 4b. Here, the image forming apparatus 100 is a tandem type color image forming apparatus. In the main body of the image forming apparatus 100, image forming portions Pa, Pb, Pc, and Pd are arranged in this order from the upstream side in a conveyance direction (the right side in FIG. 1). The image forming portions Pa to Pd are provided corresponding to images of four different colors (cyan, magenta, yellow, and black), and form images of cyan, magenta, yellow, and black in order through charging, exposing, developing, and transferring steps.

In the image forming portions Pa, Pb, Pc, and Pd, there are disposed photosensitive drums 1a, 1b, 1c, and 1d, respectively, each for carrying a visible image (toner image) of a corresponding color, and further, an intermediate transfer belt 8 is disposed adjacent to the image forming portions Pa to Pd so as to rotate in a clockwise direction in FIG. 1. The toner images formed on the photosensitive drums 1a to 1d are transferred in order onto the intermediate transfer belt 8, which moves in contact with the photosensitive drums 1a to 1d. Thereafter, the toner images are transferred onto a transfer sheet of paper P at a secondary transfer roller 9, and further, the toner images are fixed on the transfer sheet of paper P at a fixing portion 7, and the transfer sheet of paper P on which the toner images are fixed is discharged from the apparatus main body. An image forming process is performed with respect to the photosensitive drums 1a to 1d while the photosensitive drums 1a to 1d rotating in a counter clockwise direction in FIG. 1.

The transfer sheet of paper P, onto which toner images are to be transferred, is stored in a sheet cassette 16 disposed in a lower part of the main body of the image forming apparatus 100, and is conveyed via a sheet feeding roller 12a and a registration roller pair 12b to the secondary transfer roller 9. Mainly used as the intermediate transfer belt 8 is a seamless belt made of a dielectric resin sheet.

Next, the image forming portions Pa to Pd will be described. Around and below the rotatably disposed photosensitive drums 1a, 1b, 1c, and 1d, there are disposed chargers 2a, 2b, 2c, and 2d that charge the photosensitive drums 1a, 1b, 1c, and 1d, respectively, light scanning devices 4a and 4b that expose the photosensitive drums 1a, 1b, 1c, and 1d with light based on image information, developing units 3a, 3b, 3c, and 3d which form toner images on the photosensitive drums 1a, 1b, 1c, and 1d, respectively, and cleaning portions 5a, 5b, 5c, and 5d which remove residual developer (toner) left on the photosensitive drums 1a, 1b, 1c, and 1d, respectively. The light scanning devices 4a and 4b are screw-fixed to a main body frame 19 of the image forming apparatus 100.

When an instruction to start image formation is input by a user, first of all, surfaces of the photosensitive drums 1a to 1d are uniformly charged by the chargers 2a to 2d. Subsequently, the light scanning devices 4a and 4b irradiate the photosensitive drums 1a to 1d with laser light, and thereby electrostatic latent images are formed on the photosensitive drums 1a to 1d corresponding to an image signal. The developing units 3a, 3b, 3c, and 3d are filled with a predetermined amount of cyan, magenta, yellow, and black toners, respectively, by a replenishment device (not shown). The cyan, magenta, yellow, and black toners are supplied by the developing units 3a, 3b, 3c, and 3d onto, and electrostatically adhere to, the photoconductive drums 1a, 1b, 1c, and 1d, respectively, and thereby cyan, magenta, yellow, and black toner images are formed corresponding to the electrostatic latent images formed by the exposure by the light scanning devices 4a and 4b.

Then, after an electric field is applied with a predetermined transfer voltage between primary transfer rollers 6a to 6d and the intermediate transfer belt 8, the cyan, magenta, yellow, and black toner images formed on the photosensitive drums 1a, 1b, 1c, and 1d are transferred by the primary transfer rollers 6a, 6b, 6c, and 6d onto the intermediate transfer belt 8. The toner images of the four colors are formed with a predetermined positional relationship therebetween that is previously determined for forming a predetermined full-color image. Thereafter, in preparation for next formation of electrostatic latent images to be successively performed, residual toners left on the surfaces of the photosensitive drums 1a to 1d are removed by the cleaning portions 5a to 5d.

The intermediate transfer belt 8 is wound around and between a conveyance roller 10 disposed on the upstream side and a driving roller 11 disposed on the down stream side. When the intermediate transfer belt 8 starts to rotate in the clockwise direction along with rotation of the driving roller 11 caused by a driving motor (not shown), the transfer sheet of paper P is conveyed from the registration roller pair 12b at a predetermined timing to the secondary transfer roller 9 disposed adjacent to the intermediate transfer belt 8, and there, a full-color toner image formed on the intermediate transfer belt 8 is transferred onto the transfer sheet of paper P. The transfer sheet of paper P onto which the toner image has been transferred is then conveyed to the fixing portion 7.

The transfer sheet of paper P conveyed to the fixing portion 7 is heated and pressed by a fixing roller pair 13, and thereby the toner image is fixed on a surface of the transfer sheet of paper P as a permanent image. The transfer sheet of paper P on which the full-color image has been fixed by the fixing portion 7 is sorted to a conveyance direction at a branch portion 14 which is branched into a plurality of directions. When forming an image only on one side of the transfer sheet of paper P, the transfer sheet of paper P is discharged as it is by discharge roller pair 15 onto a delivery tray 17.

On the other hand, to form images on both sides of the transfer sheet of paper P, the discharge roller pair 15 is reversely rotated to draw the transfer sheet of paper P back into the apparatus after most part of the transfer sheet of paper P is discharged onto the delivery tray 17. The drawn-back transfer sheet of paper P is sorted at the branch portion 14 to a reverse conveyance path 18, to be conveyed back to the secondary transfer roller 9 with the image side turned around. Then the next image formed on the intermediate transfer belt 8 is transferred by the secondary transfer roller 9 onto the side of the transfer sheet of paper P on which no image has been formed yet, and then the transfer sheet of paper P is conveyed to the fixing portion 7 where the next toner image is fixed on the transfer sheet of paper P, which is then discharged onto the delivery tray 17.

Figure 2:
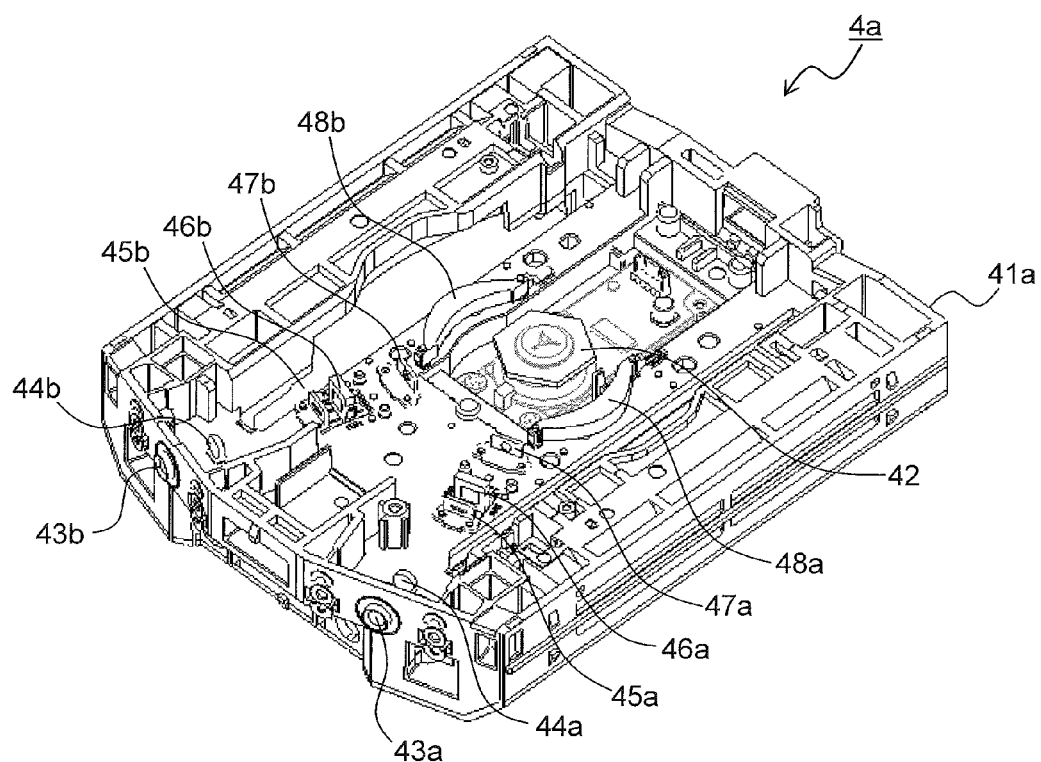
Figure 3:
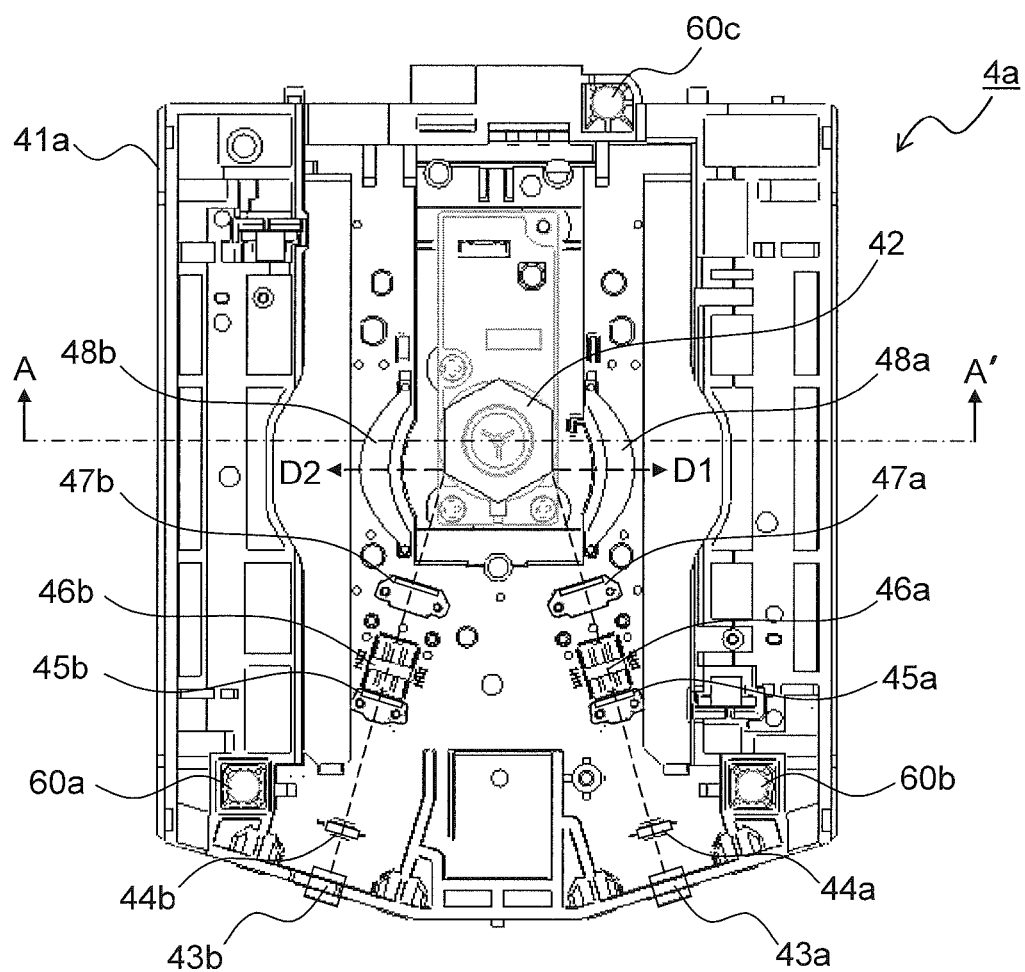
Figure 4:
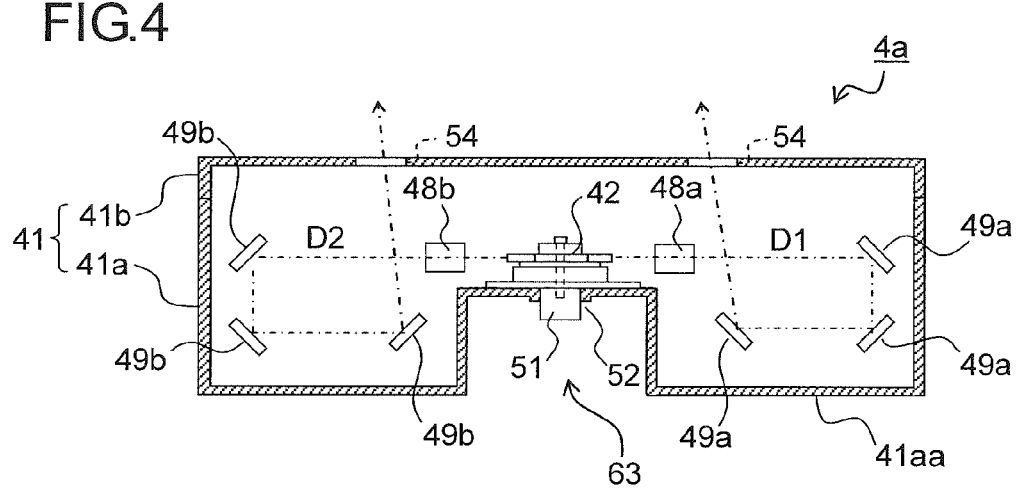

FIG. 2 and FIG. 3 are a perspective view and a plan view, respectively, each illustrating an internal structure of the light scanning device 4a of the present disclosure, and FIG. 4 is a side sectional view (taken along line AA' of FIG. 3) schematically illustrating the internal structure of the light scanning device 4a. FIG. 2 and FIG. 3 each illustrate the light scanning device 4a with an upper lid 41b removed so that the inside of the light scanning device 4a is visible. The description here will be concentrated on the structure of the light scanning device 4a, but it should be noted that the light scanning device 4b is completely the same in structure as the light scanning device 4a.

As illustrated in FIG. 2 to FIG. 4, the light scanning device 4a has a housing 41 constituted by a housing main body 41a and an upper lid 41b, and a polygon mirror 42 is disposed at a substantially center part of the housing main body 41a. In the present embodiment, the polygon mirror 42 is a rotating polygon mirror having a regular hexagonal shape with six deflection side faces (reflection faces), and is made to rotate at a predetermined rate by a polygon motor 51. The polygon motor 51 is fitted in a motor positioning hole 52 formed in a bottom surface of the housing main body 41a.

On a side wall on a front side (a lower side in FIG. 3) of the housing main body 41a, two light sources 43a and 43b are disposed. The light sources 43a and 43b are each constituted by a laser diode (LD), and emit light beams (laser light) D1 and D2, respectively, based on the image signal.

Disposed between the light sources 43a, 43b and the polygon mirror 42 are two collimator lenses 44a and 44b provided corresponding to the light sources 43a and 43b, respectively, two first apertures 45a and 45b that give a predetermined optical path width to the light beams D1 and D2 that have passed through the collimator lenses 44a and 44b, respectively, two cylindrical lenses 46a and 46b through which the light beams D1 and D2 pass, respectively, after passing through the first apertures 45a and 45b, and second apertures 47a and 47b that give a predetermined optical path width to the light beams D1 and D2 that have passed through the cylindrical lenses 46a and 46b, respectively.

The collimator lenses 44a and 44b make the light beams D1 and D2 emitted from the light sources 43a and 43b, respectively, substantially parallel light beams, and the cylindrical lenses 46a and 46b each have a predetermined refractive power only in a sub-scanning direction (a direction perpendicular to a sheet surface of FIG. 3). Furthermore, inside the housing main body 41a, scanning lenses 48a and 48b are disposed opposite from each other with respect to the polygon mirror 42. The scanning lenses 48a and 48b each have an fθ characteristic, and make the light beams D1 and D2 deflected and reflected by the polygon mirror 42 form images on the photosensitive drums 1a to 1d (see FIG. 1). On optical paths of the light beams D1 and D2, from the scanning lenses 48a and 48b to the photosensitive drums 1a to 1d (see FIG. 1), three plane mirrors 49a and three plane mirrors 49b are disposed, respectively.

Now, a description will be given of a light-beam scanning operation performed by the light scanning device 4a configured as described above. First, as shown in FIG. 2 and FIG. 3, the light beams D1 and D2 emitted from the light sources 43a and 43b are made into the substantially parallel light beams by the collimator lenses 44a and 44b, and given a predetermined light path width by the first apertures 45a and 45b. Next, the light beams D1 and D2 as substantially parallel light beams are directed into the cylindrical lenses 46a and 46b. The light beams D1 and D2 that have respectively entered the cylindrical lenses 46a and 46b are emitted from the cylindrical lenses 46a and 46b as they are in the state of parallel light beams in a main scanning cross section and in a converged state in the sub-scanning direction, and then the light beams D1 and D2 are each given a predetermined light path width by the second apertures 47a and 47b, and thereafter, each form a linear image on a deflection surface of the polygon mirror 42.

The light beams D1 and D2 incident on the polygon mirror 42 are each deflected by the polygon mirror 42 at a constant angular velocity, and then deflected by the scanning lenses 48a and 48b, respectively, at a constant velocity. After passing through the scanning lenses 48a and 48b, the light beams D1 and D2 are bent a predetermined number of times (here, three times) by the plane mirrors 49a and the plane mirrors 49b, respectively, as shown in FIG. 4, and then delivered onto the photosensitive drums 1c and 1d through windows 54 formed in the upper lid 41b. Also, light beams emitted from the light scanning device 4b are delivered onto the photosensitive drums 1a and 1b in the same manner.

Figure 5:
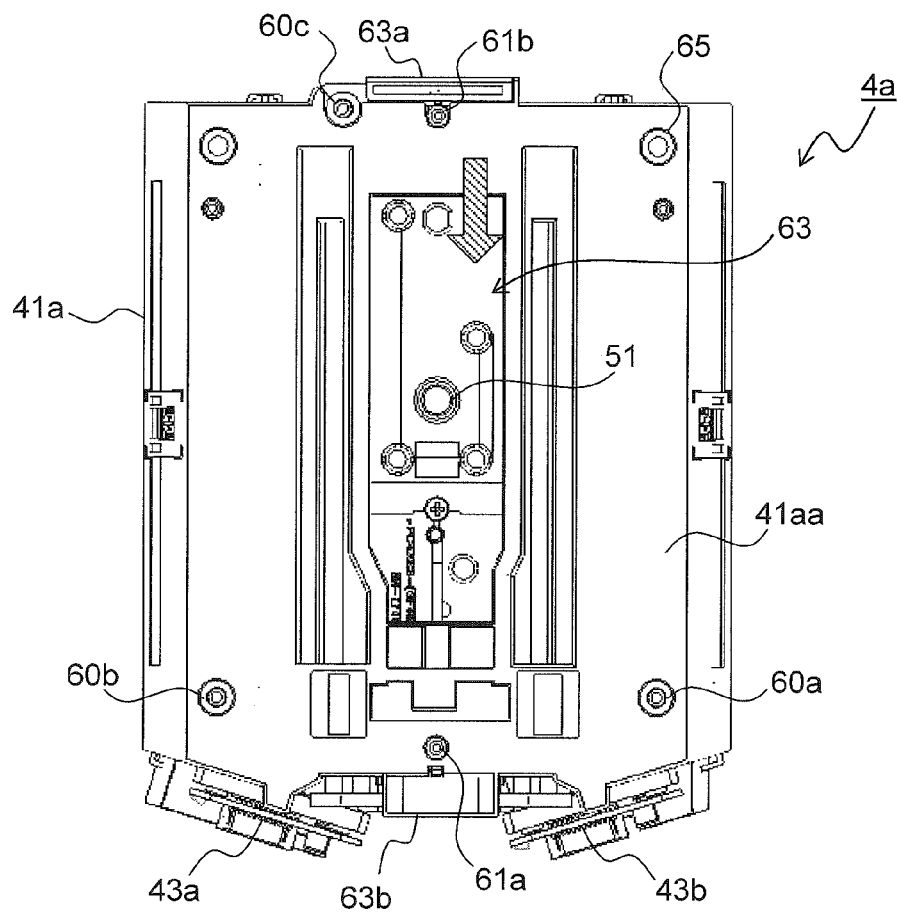
FIG. 5 is a plan view illustrating the light scanning device 4a as seen from a back side.
Figure 6:
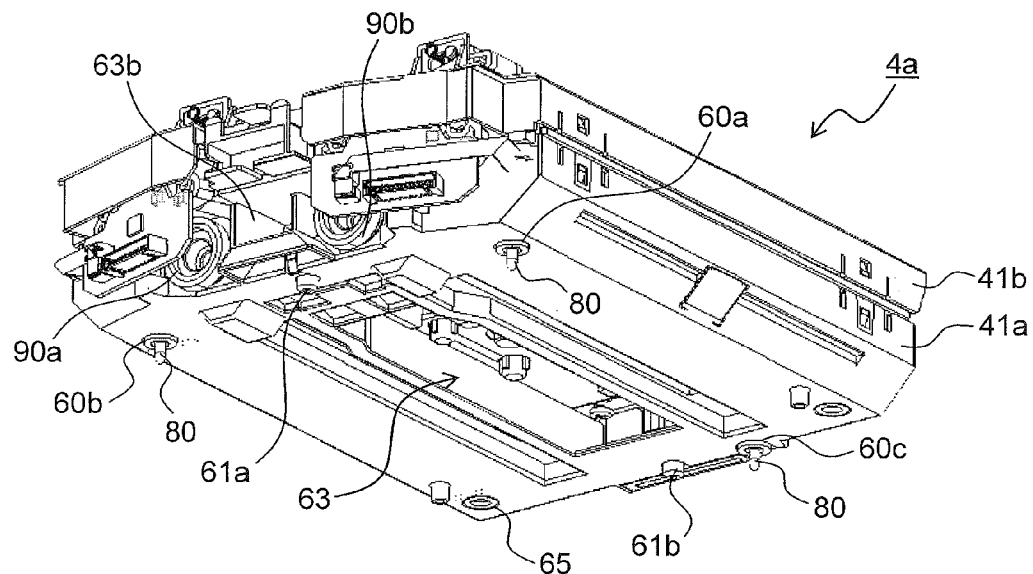
FIG. 6 is a perspective view illustrating the light scanning device 4a as seen from a side of light sources 43a and 43b.
Figure 7:
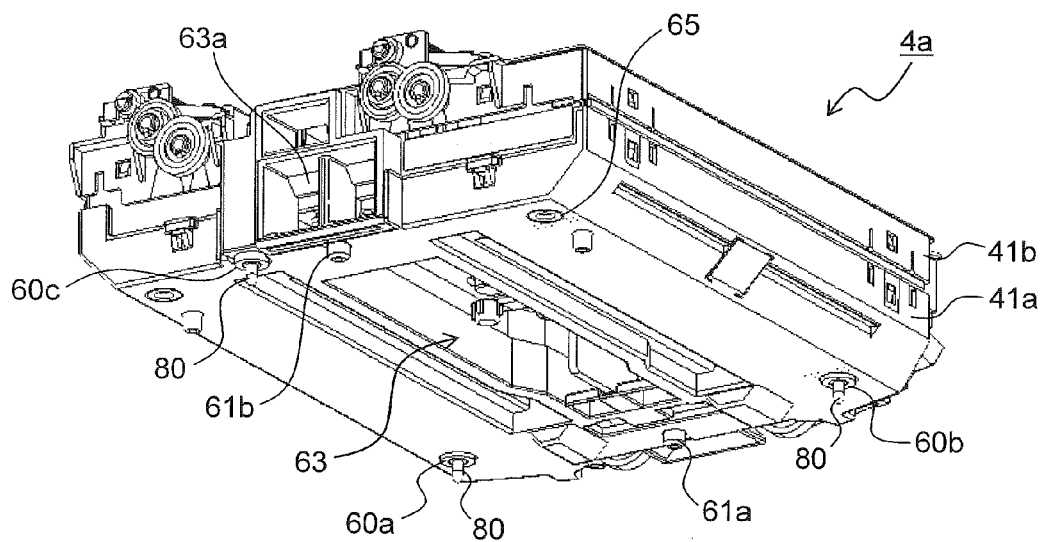
FIG. 7 is a perspective view illustrating the light scanning device 4a as seen from a side opposite from the light sources 43a and 43b.
Figure 8:
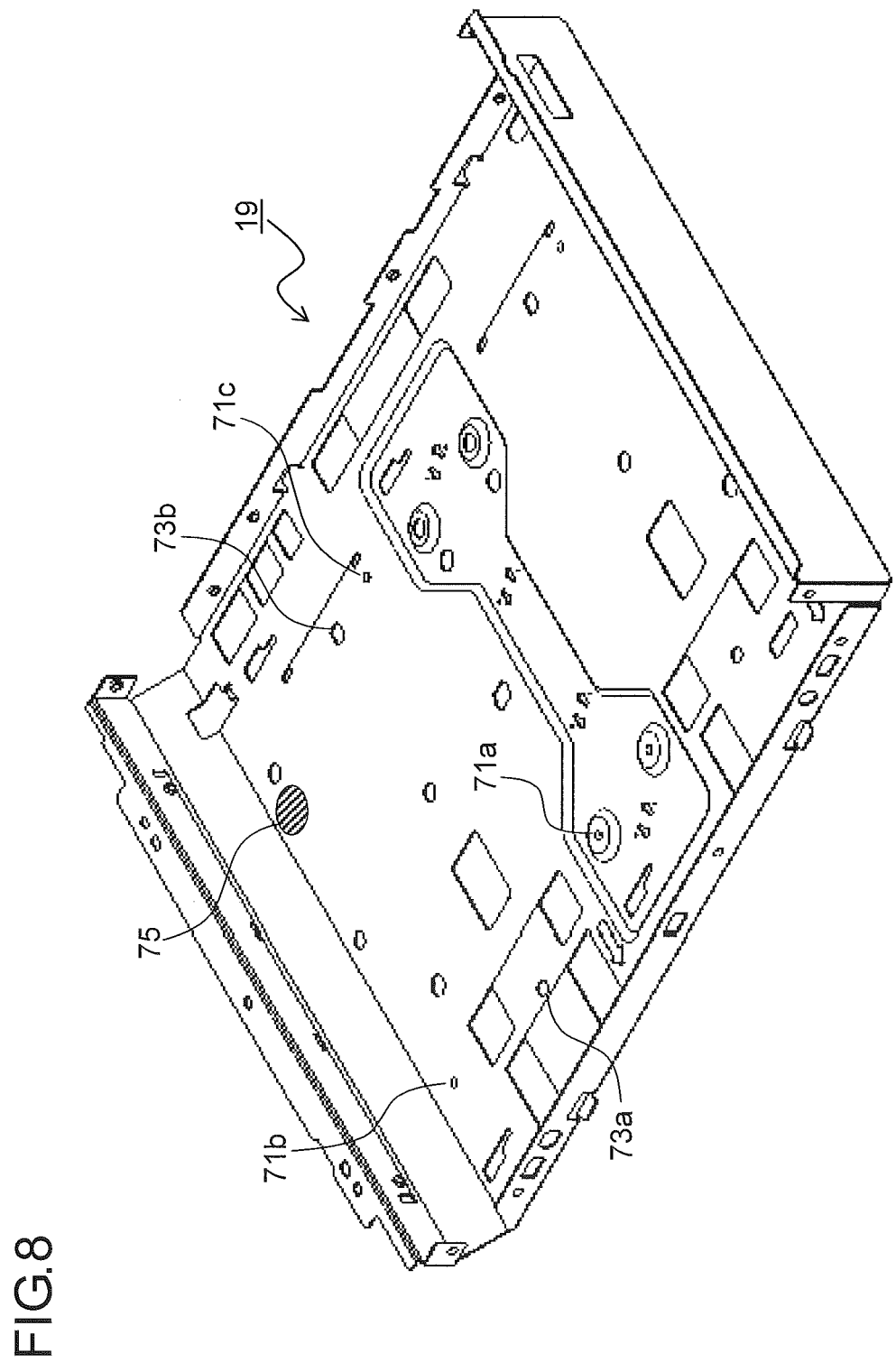
FIG. 8 is a perspective view illustrating a main body frame 19 to which the light scanning devices 4a and 4b are fixed.

FIG. 5 is a plan view illustrating the light scanning device 4a as seen from a back side, FIG. 6 and FIG. 7 are perspective views illustrating the light scanning device 4a as seen from the light sources 43a and 43b side and from a side opposite from the light sources 43a and 43b side, respectively, and FIG. 8 is a perspective view illustrating a main body frame 19 to which the light scanning devices 4a and 4b are fixed. With reference to FIG. 5 to FIG. 8, a description will be given of a structure for attaching the light scanning devices 4a and 4b to the main body frame 19. The description given below will be concentrated on the light scanning device 4a, but the description is completely applicable to the light scanning device 4b as well.

As shown in FIG. 5, on a bottom surface 41aa of the housing main body 41a, a first fastening portion 60a, a second fastening portion 60b, and a third fastening portion 60c are provided. The first to third fastening portions 60a to 60c are each a ring shaped projection projecting from the bottom surface 41aa of the housing main body 41a, each having a through hole formed in its center into which a screw 80 (see FIG. 7) is to be inserted.

The first and second fastening portions 60a and 60b are disposed on the light sources 43a and 43b side (lower side in FIG. 5) of the bottom surface 41aa such that the light sources 43a and 43b are located between the first and second fastening portions 60a and 60b. The third fastening portion 60c is disposed on a side (upper side in FIG. 5) of the bottom surface 41 as opposite from the light sources 43a and 43b. With this arrangement, it is possible to stably fasten the light sources 43a and 43b side of the housing main body 41a to the main body frame 19.

On the bottom surface 41aa, on the light sources 43a and 43b side and on the side opposite from the light sources 43a and 43b side (upper and lower end portions in FIG. 5), positioning bosses 61a and 61b, with which the housing main body 41a is to be positioned with respect to the main body frame 19, are provided projecting from the bottom surface 41aa. The positioning bosses 61a and 61b are each disposed in a center part in a width direction (a right-left direction in FIG. 5) of the housing main body 41a.

As illustrated in FIG. 6 and FIG. 7, the bottom surface 41 as has a cooling duct in a concave shape provided over a center part thereof in its width direction (the right-left direction in FIG. 5) from the light sources 43a and 43b side to the side opposite from the light sources 43a and 43b side. The cooling duct 63 has an air inlet port 63a on the side opposite from the light sources 43a and 43b, and an air outlet port 63b on the light sources 43a and 43b side.

As illustrated in FIG. 5, when the cooling duct 63 is seen from the bottom surface 41aa side, the center part of the cooling duct 63 is wide open, and when the light scanning device 4a is fixed to the main body frame 19 (see FIG. 8), the main body frame 19 constitutes part of a bottom surface of the cooling duct 63. At two end parts (in the vicinity of the air inlet port 63a and the air outlet port 63b) of the cooling duct 63, the bottom surface 41 as is partly left in a bridge-like manner and constitutes part of the bottom surface of the cooling duct 63. The two positioning bosses 61a and 61b are disposed on these bridge-like parts of the bottom surface 41aa, and project outward therefrom.

An air flow generated by a cooling fan (not shown) flows in the cooling duct 63 from the air inlet port 63a toward the air outlet port 63b (a direction indicated by an arrow in FIG. 5), and thereby cools down the polygon motor 51 (see FIG. 4) projecting inside the cooling duct 63. This makes it possible to reduce thermal deformation of the housing main body 41a caused by heat from the polygon motor 51.

The main body frame 19 is made of a sheet metal, and as illustrated in FIG. 8, the main body frame 19 has screw fastening holes 71a to 71c where the screws 80 are to be fastened; the screw fastening holes 71a to 71c are disposed in positions that are to be opposite the first to third fastening portions 60a to 60c of the housing main body 41a when the light scanning device 4a is installed. The main body frame 19 also has engagement holes 73a and 73b in which the positioning bosses 61a and 61b are to be engaged; the engagement holes 73a and 73b are disposed in positions opposite the positioning bosses 61a and 61b of the housing main body 41a.

According to the present embodiment, the third fastening portion 60c on the side opposite from the light sources 43a and 43b is disposed in a position that does not overlap the cooling duct 63 as seen from a fastening direction of the screws 80 (a direction perpendicular to a sheet surface of FIG. 5). This helps eliminate a risk of the one of the screws 80 that is fastened at the third fastening portion 60c blocking the air flow flowing in the cooling duct 63 and a risk of degradation of efficiency of the cooling of the polygon motor 51.

The positioning bosses 61a and 61b are disposed to overlap the cooling duct 63, but the positioning bosses 61a and 61b project solely outward from the bottom surface 41aa constituting the bottom surface of the cooling duct 63, and thus do not project into the cooling duct 63. This helps eliminate a risk of the positioning bosses 61a and 61b blocking the air flow flowing in the cooling duct 63.

Here, the third fastening portion 60c disposed on the side opposite from the light sources 43a and 43b is positioned to be displaced from a center part of the housing main body 41a in its width direction, and with this arrangement, when vibration is caused by an external force, the side of the light scanning device 4a opposite from the third fastening portion 60c (the right side in FIG. 5) vibrates at a large amplitude.

To prevent this, as illustrated in FIG. 8, the main body frame 19 has an anti-vibration member 75 made of an elastic material attached thereto at a position opposite the side of the housing main body 41a that is opposite from the third fastening portion 60c, and the housing main body 41a has an abutment portion 65 formed in the bottom surface 41aa thereof for the anti-vibration member 75 to abut.

Figure 9:
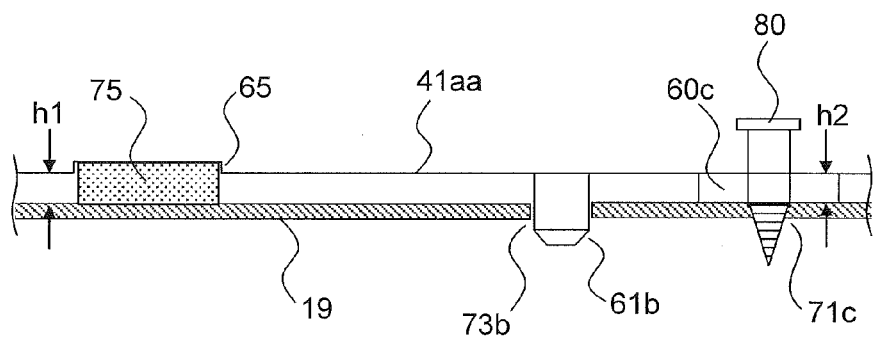
FIG. 9 is a sectional view illustrating a part of a housing 41 on the side opposite from the light sources 43a and 43b, with the light scanning device 4a fixed to the main body frame 19.

FIG. 9 is a sectional view illustrating a part of the housing 41 on the side opposite from the light sources 43a and 43b with the light scanning device 4a fixed to the main body frame 19. As illustrated in FIG. 9, the abutment portion 65 is formed by slightly recessing the bottom surface 41aa in substantially the same shape as the anti-vibration member 75 to prevent horizontal displacement between the abutment portion 65 and the anti-vibration member 75 after the anti-vibration member 75 abuts the abutment portion 65. The size of the anti-vibration member 75 in its height direction is adjusted such that, with the anti-vibration member 75 and the abutment portion 65 abutting each other, a projection height h1 by which the anti-vibration member 75 projects from the bottom surface 41aa of the housing main body 41a and a height h2 of the third fastening portion 60c are substantially equal. This makes it possible to hold the housing main body 41a substantially horizontal with respect to the main body frame 19.

Figure 10:
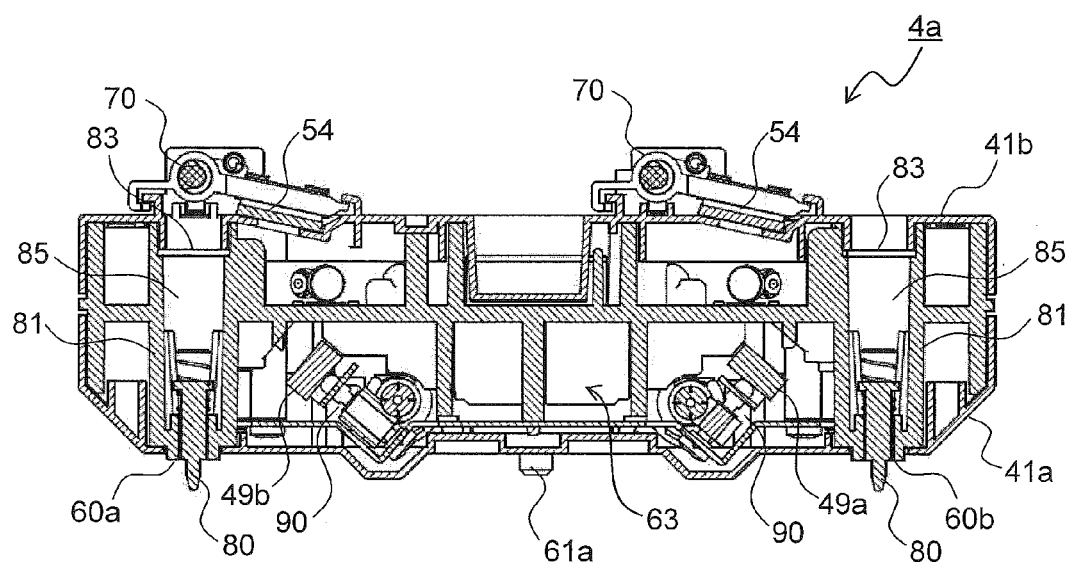
FIG. 10 is a sectional view illustrating a part of the housing 41 on the side of the light sources 43a and 43b, with the light scanning device 4a fixed to the main body frame 19.
Figure 11:
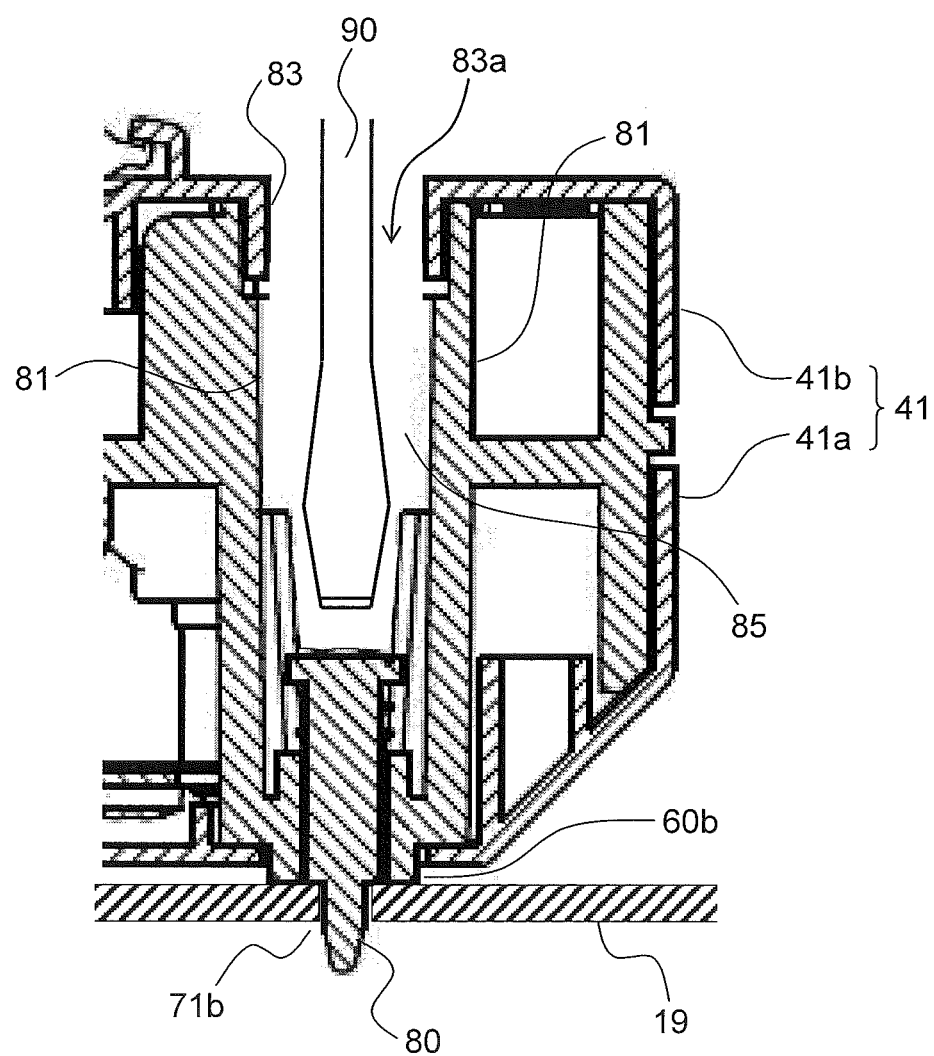
FIG. 11 is an enlarged view illustrating part around a second fastening portion 60b in FIG. 10.

FIG. 10 is a sectional view illustrating a part of the housing 41 on the side of the light sources 43a and 43b with the light scanning device 4a fixed to the main body frame 19, and FIG. 11 is an enlarged view illustrating part around the second fastening portion 60b in FIG. 10. On the bottom surface 41 as of the housing main body 41a, ribs 81 are provided to stand surrounding the through holes formed in the first and second fastening portions 60a and 60b. The ribs 81 are each formed in a rectangular-frame shape in plan view, with a height, from the bottom surface 41aa to the upper lid 41b of the housing 41, substantially the same as a height of the housing main body 41b. To upper end parts of the ribs 81, concave portions 83 of the upper lid 41 are fitted one to one, and the ribs 81 and the concave portions 83 together form reinforcement portions 85 that reinforce the first and second fastening portions 60a and 60b.

The concave portions 83 each have an opening (not shown) formed therein, so that the screw 80 can be fastened by inserting a screwdriver through the opening. The reinforcement portions 85 are isolated by the ribs 81 from an inside of the housing main body 41a in which optical members such as the polygon mirror 42 and the scanning lenses 48a and 48b are accommodated, and thus there is no risk of dust entering the inside of the housing main body 41a. Here, although not illustrated, the third fastening portion 60c is also surrounded by a rib 81 formed in a rectangular-frame shape in plan view, and a reinforcement portion 85 is formed by the rib 81 and a concave portion 83.

Inside the housing main body 41a, there is disposed a skew adjustment mechanism 90 for adjusting deviation (skew) of an optical path with respect to the photosensitive drums 1c and 1d (surfaces to be scanned). By turning adjustment handles 90a and 90b (see FIG. 6) of the skew adjustment mechanism 90 in a predetermined direction, pressure members each abutting a longitudinal-direction end side of one of the plane mirrors 49a and 49b disposed in immediate vicinity of the windows 54 are made to move in a reciprocating manner in a direction perpendicular to reflection surfaces of the plane mirrors 49a and 49b, to thereby adjust longitudinal-direction inclinations of the plane mirrors 49a and 49b. Furthermore, on an upper surface (the upper lid 41b) of the light scanning device 4a, there are provided screws 70 that make cleaning members (not shown) for cleaning the windows 54 move in a reciprocating manner along the windows 54.

To fit the light scanning device 4a to the main body frame 19, positioning is first performed of the polygon mirror 42, the light sources 43a and 43b, the apertures 47a and 47b, the scanning lenses 48a and 48b, etc., inside the housing main body 41a, and then the upper lid 41b is attached to the housing main body 41a to seal the housing 41. Next, the housing main body 41a is placed on the main body frame 19. Then, the positioning bosses 61a and 61b formed on the bottom surface 41 as of the housing main body 41a are engaged in engagement holes 73a and 73b. Thereby, the housing main body 41a is positioned with respect to the main body frame 19, so that the through holes of the first, second, and third fastening portions 60a, 60b, and 60c and the screw fastening holes 71a, 71b, and 71c, respectively, overlap each other.

Thereafter, as illustrated in FIG. 11, a screwdriver 90 is inserted into the reinforcement portions 85 via the openings of the concave portions 83 formed in the upper lid 41b, and the screws 80 are fastened into the screw fastening holes 71a, 71b, and 71c via the through holes of the first, second, and third fastening portions 60*a*, 60*b*, and 60*c*, respectively, and thereby the light scanning device 4*a* is fixed to the main body frame 19.

Figure 12:
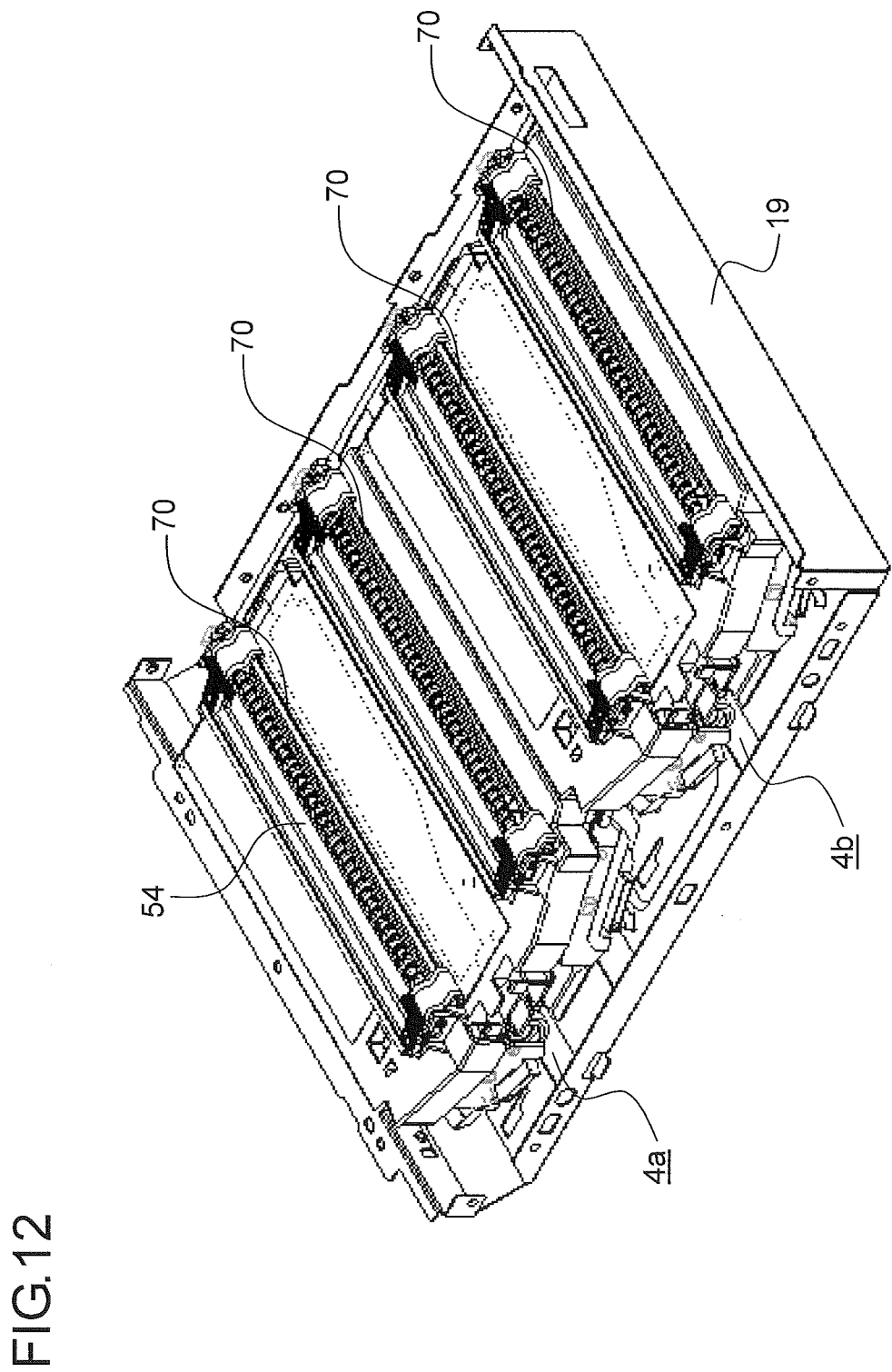
FIG. 12 is a perspective view illustrating the light scanning devices 4a and 4b fixed to the main body frame 19.

The light scanning device 4*b* is also fitted to the main body frame 19 in the same manner as described above, and the fitting of the light scanning devices 4*a* and 4*b* with respect to the main body frame 19 is completed. The light scanning devices 4*a* and 4*b* fixed to the main body frame 19 are illustrated in FIG. 12.

According to the light scanning devices 4*a* and 4*b* that have been described above, the third fastening portion 60*c*, where one of the screws 80 for fixing the housing main body 41*a* to the main body frame 19 is fastened, is disposed at a position that does not overlap the cooling duct 63 formed in the center part of the housing main body 41*a*. Further, the positioning bosses 61*a* and 61*b* formed in the center part of the housing main body 41*a* project only outward from the bottom surface 41*aa*. As a result, the risk is eliminated of the screw 80 blocking an air flow flowing in the cooling duct 63, and this makes it possible to effectively reduce deformation of the housing main body 41*a* caused by heat from the polygon motor 51. Thus, it is possible to reduce optical path deviation caused by thermal deformation of the housing main body 41*a*.

On the bottom surface 41 as of the housing main body 41*a*, on the side opposite from the third fastening portion 60*c*, the abutment portion 65 is formed which the anti-vibration member 75 on the main body frame 19 side abuts. This makes it possible, when the housing main body 41*a* is caused to vibrate, to restrict the amplitude to be small on the side opposite from the third fastening portion 60*c*.

Furthermore, since a screwdriver can be inserted into the reinforcement portions 85 through the openings formed in the concave portions 83, it is possible to fasten the screws 80 with the upper lid 41*b* fixed to the housing main body 41*a*. Here, since the reinforcement portions 85 are isolated from the inside of the housing 41 as a result of the fitting between the ribs 81 and the concave portions 83, the inside of the housing main body 41*a*, where optical components such as the light sources 43*a* and 43*b* and the polygon mirror 42 are accommodated, is maintained sealed, and thus there is no risk of dust entering the inside of the housing 41.

Moreover, by the fitting between the upper end parts of the ribs 81 formed in the housing main body 41*a* and the concave portions 83 of the upper lid 41*b*, the housing main body 41*a* and the upper lid 41*b* are positioned. That is, the ribs 81 and the concave portions 83 function also as a positioning mechanism for the housing main body 41*a* and the upper lid 41*b*.

Figure 13:
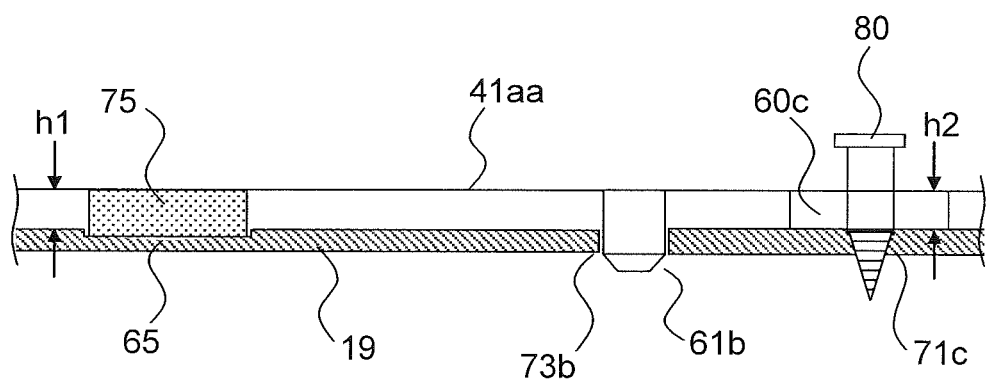
FIG. 13 is a sectional view illustrating the part of the housing 41 on the side opposite from the light sources 43a and 43b, with the light scanning device 4a, where an anti-vibration member 75 is fixed to a bottom surface 41aa, fixed to the main body frame 19, where an abutment portion 65 is formed.

It should be understood that the present disclosure is not limited to the above embodiments, and various modifications are possible within the scope of the present disclosure. For example, in the above embodiment the anti-vibration member 75 is disposed on the main body frame 19 side, and the abutment portion 65, which the anti-vibration member 75 abuts, is formed on the housing main body 41*a* side of each of the light scanning devices 4*a* and 4*b*, but it is also possible, as illustrated in FIG. 13, to fix the anti-vibration member 75 to the housing main body 41*a* side and form the abutment portion 65 on the main body frame 19 side.

In the embodiment described above, the reinforcement portions 85 are formed with the ribs 81 having a height substantially the same as the height of the housing main body 41*a*, but the shape of the ribs 81 is not limited to a rectangular-frame shape in plan view, and as long as formed as tube-shaped ribs respectively surrounding the first to third fastening portions 60*a* to 60*c*, the ribs 81 may also be circular-frame (ring) shaped or triangular-frame shaped in plan view.

The embodiment described above has dealt with the two-beam light scanning devices 4*a* and 4*b* each provided with two light sources 43*a* and 43*b*, but application of the present disclosure is not limited to two-beam light scanning devices, and the present disclosure is also applicable to four-beam light scanning devices provided with four light sources, or to single-beam light scanning devices for monochrome copiers, monochrome printers, etc.

The present disclosure is usable in light scanning devices that write and form images by scanning beams of light in image forming apparatuses such as printers, copiers, and facsimile machines. By using the present disclosure, it is possible to provide a light scanning device that is capable of securely positioning and fastening its housing with respect to the main body frame of an image forming apparatus, and is also capable of reducing degradation of the efficiency of cooling by means of a cooling duct provided in the housing, and an image forming apparatus incorporating such a light scanning device.

What is claimed is:

1. A light scanning device that deflects a light beam and scans the deflected light beam on a target surface, the light scanning device comprising:
   a housing constituted by a housing main body and an upper lid attached to an opening of the housing main body;
   a light source that is supported at one end side of the housing main body and emits a light beam;
   a polygon mirror that deflects the light beam emitted from the light source;
   a polygon motor that is supported at a substantially center part of the housing main body and drives the polygon mirror to rotate;
   a cooling duct that is provided in the housing main body to extend from a light-source side, through the substantially center part of the housing main body, to a side opposite from the light source, and through which flows an air flow that cools down the polygon motor; and
   a fastening portion where screws are fastened for fixing the housing to a main body frame of an image forming apparatus, and that is constituted by
      first and second fastening portions disposed on the light-source side of the housing main body so as to sandwich the light source therebetween and
      a third fastening portion disposed in a position in the housing main body that is on the side opposite from the light source and that does not overlap the cooling duct as seen from a screw-fastening direction,
   wherein
   in a bottom surface of the housing main body, an abutment portion is provided on a side opposite from the third fastening portion with respect to the cooling duct, and an anti-vibration member fixed to the main body frame abuts the abutment portion.

2. The light scanning device of claim 1,
   wherein
   with the anti-vibration member abutting the abutment portion, a dimension of the anti-vibration member in a direction of height thereof measured between the bottom surface of the housing main body and the main body frame is substantially equal to a dimension of the third fastening portion in a direction of height thereof.

3. The light scanning device of claim 1,
   wherein
   a positioning boss that positions the housing by engaging in an engagement hole in the main body frame is disposed on a bottom surface of the housing main body to project outward from the bottom surface as seen from the screw-fastening direction.

4. An image forming apparatus comprising the light scanning device of claim 1.

5. A light scanning device that deflects a light beam and scans the deflected light beam on a target surface, the light scanning device comprising:
 a housing constituted by a housing main body and an upper lid attached to an opening of the housing main body;
 a light source that is supported at one end side of the housing main body and emits a light beam;
 a polygon mirror that deflects the light beam emitted from the light source;
 a polygon motor that is supported at a substantially center part of the housing main body and drives the polygon mirror to rotate;
 a cooling duct that is provided in the housing main body to extend from a light-source side, through the substantially center part of the housing main body, to a side opposite from the light source, and through which flows an air flow that cools down the polygon motor; and
 a fastening portion where screws are fastened for fixing the housing to a main body frame of an image forming apparatus, and that is constituted by
  first and second fastening portions disposed on the light-source side of the housing main body so as to sandwich the light source therebetween and
  a third fastening portion disposed in a position in the housing main body that is on the side opposite from the light source and that does not overlap the cooling duct as seen from a screw-fastening direction,
 wherein
 to a bottom surface of the housing main body, on a side opposite from the third fastening portion with respect to the cooling duct, an anti-vibration member is fixed which abuts the abutment portion of the main body frame.

6. The light scanning device of claim 5,
 wherein
 with the anti-vibration member abutting the abutment portion, a dimension of the anti-vibration member in a direction of height thereof measured between the bottom surface of the housing main body and the main body frame is substantially equal to a dimension of the third fastening portion in a direction of height thereof.

7. An image forming apparatus comprising the light scanning device of claim 5.

8. A light scanning device that deflects a light beam and scans the deflected light beam on a target surface, the light scanning device comprising:
 a housing constituted by a housing main body and an upper lid attached to an opening of the housing main body;
 a light source that is supported at one end side of the housing main body and emits a light beam;
 a polygon mirror that deflects the light beam emitted from the light source;
 a polygon motor that is supported at a substantially center part of the housing main body and drives the polygon mirror to rotate;
 a cooling duct that is provided in the housing main body to extend from a light-source side, through the substantially center part of the housing main body, to a side opposite from the light source, and through which flows an air flow that cools down the polygon motor; and
 a fastening portion where screws are fastened for fixing the housing to a main body frame of an image forming apparatus, and that is constituted by
  first and second fastening portions disposed on the light-source side of the housing main body so as to sandwich the light source therebetween and
  a third fastening portion disposed in a position in the housing main body that is on the side opposite from the light source and that does not overlap the cooling duct as seen from a screw-fastening direction,
 wherein
 the housing main body comprises a tube-shaped rib projecting from inside a bottom surface of the housing main body to a height that is substantially equal to a height of the housing main body so as to surround the fastening portion, and the rib and the upper lid together form a reinforcement portion to reinforce the fastening portion.

9. The light scanning device of claim 8,
 wherein
 the upper lid comprises a concave portion that fits in an upper end part of the rib.

10. The light scanning device of claim 9,
 wherein
 the reinforcement portion is isolated, by the fitting between the rib and the concave portion, from an inside of the housing where the light source and the polygon mirror are accommodated.

11. The light scanning device of claim 10,
 wherein
 the upper lid comprises an opening that communicates with the reinforcement portion.

12. An image forming apparatus comprising the light scanning device of claim 8.

* * * * *